United States Patent [19]

Miyajima et al.

[11] Patent Number: 4,760,104

[45] Date of Patent: Jul. 26, 1988

[54] ERASABLE BALL-POINT PEN INK

[75] Inventors: Tamotsu Miyajima; Noriatsu Tanaka, both of Kanagawa; Nobuto Saito, Gunma, all of Japan

[73] Assignee: Pilot Man-Nen-Hitsu Kabushiki Kaisha, Japan

[21] Appl. No.: 731,805

[22] Filed: May 8, 1985

Related U.S. Application Data

[63] Continuation-in-part of Ser. No. 547,283, Oct. 31, 1983.

[30] Foreign Application Priority Data

Oct. 29, 1982 [JP] Japan ................................ 57-189087

[51] Int. Cl.$^4$ ............................................. C09D 11/12
[52] U.S. Cl. ...................................... 523/161; 106/23; 106/27; 106/31; 106/32
[58] Field of Search ................... 106/23, 22, 20, 308 Q, 106/308 M, 32, 31, 27; 523/161

[56] References Cited

U.S. PATENT DOCUMENTS

| | | | |
|---|---|---|---|
| 4,097,290 | 6/1978 | Muller et al. | 106/30 |
| 4,329,262 | 5/1982 | Muller | 523/161 |
| 4,329,264 | 5/1982 | Muller | 523/162 |
| 4,337,183 | 6/1982 | Santiago | 524/446 |

FOREIGN PATENT DOCUMENTS

| | | |
|---|---|---|
| 2094820 | 9/1982 | United Kingdom . |
| 0061886 | 10/1982 | European Pat. Off. . |
| 0061552 | 10/1982 | European Pat. Off. . |

Primary Examiner—Amelia B. Yarbrough
Attorney, Agent, or Firm—Sughrue, Mion, Zinn, Macpeak, and Seas

[57] ABSTRACT

An erasable ball-point pen ink is disclosed. The ink is comprised of a rubber component, a volatile solvent, an organic pigment and a nonvolatile solvent, which additionally contains fine powders of silicon dioxide formed by the hydrolysis of silicon tetrachloride, the hydrolysis being carried out by a high temperature gas phase reaction; a semisolid substance; a soft solid substance having a melting point of not more than 130° C.; a combination of fine powders of silicon dioxide formed by the hydrolysis of silicon tetrachloride, the hydrolysis being carried out by a high temperature gas phase reaction, and a semisolid substance; or a combination of fine powders of silicon dioxide formed by the hydrolysis of silicon tetrachloride, the hydrolysis being carried out by a high temperature gas phase reaction, and a soft solid substance having a melting point not higher than 130° C. The ink can be used in a ball-point pen to make it possible to write fine letters and is capable of maintaining highly stable ink traces over long distances compared with presently available ball-point pen inks. The traces produced are even and show good intensity. Further, the ink does not produce substantial wear of ball holder with respect to the pen components. In addition to the excellent writing performances of the disclosed ink it retains the same or better erasability than erasable inks presently available in the market.

11 Claims, No Drawings

ERASABLE BALL-POINT PEN INK

CROSS-REFERENCE TO RELATED APPLICATION

This application is a continuation-in-part of U.S. application Ser. No. 547,283 filed Oct. 31, 1983 and entitled ERASABLE BALL-POINT PEN INK in the names of Tamotsu Miyajima et al.

FIELD OF THE INVENTION

The present invention relates to an erasable ball-point pen ink. More specifically, it relates to an ink suited for use in ball-point pens, in particular, for use in ball-point pens to make it possible to write fine letters and capable of forming ink traces which remain erasable by a rubber eraser within a certain period of time and of providing excellent writing performance.

BACKGROUND OF THE INVENTION

In erasable ball-point pen ink as described in, for example, U.S. Pat. No. 4,097,290, 4,329,264, 4,329,262, it is generally required that (1) in order to render ink traces erasable, a pigment, not a dye, must be used as a coloring agent for ink, and in addition a rubber must be used and, at the same time, ink per se must be provided with an extremely high viscosity, e.g., as high as 1,000,000 to 6,000,000 cps.

On the other hand, in ball-point pens to make it possible to write fine letters, it is generally required that (2) in order to make it possible to write fine letters, ball-point pens must be provided with a writing ball having a small diameter (.e.g., not more than 0.8 mm) and a narrow clearance (ca. 3 microns) between the writing ball and the ball holder.

However, when both of the above requirements (1) and (2) are satisfied in a ball-point pen at the same time, the following disadvantages in writing performance are known to exist.

(3) Satisfactory writing properties could hardly be obtained since ink traces become faint, thin or discontinued;

(4) When used over a long period of time (say more than a writing length of 400 to 1000 m), the ball holder of the ball-point pen may be worn to such an extent that distinctly uneven ink traces are produced, globs of ink due to overflow thereof are formed and, in extreme cases, the writing ball falls out of the ball holder, making the pen completely useless;

(5) In cases where an ink having a relatively low viscosity and a fairly large stringiness is used, so-called "string-forming phenomenon" is liable to occur, thereby forming strings of the ink from the writing tip like a spider's thread; and (6) When a ball-point pen remained unused for some time, the surface of writing ball of the ball-point pen is covered with a film of dried ink, thus impairing initial writing properties when the ball-point pen is reused.

SUMMARY OF THE INVENTION

An object of the present invention is to provide an erasable ball-point pen ink free from the disadvantages (3) to (6) and capable of providing excellent writing performance, while maintaining or improving the erasability of ink traces, without impairing it, as well as satisfying the requirements (1) and (2) described above.

Other objects of the invention will be apparent from the following descriptions.

In accordance with the present invention, there is provided an erasable ball-point pen ink comprising a rubber component, a volatile solvent, an organic pigment and a nonvolatile solvent, which additionally comprises fine powders of silicon dioxide formed by the hydrolysis of silicon tetrachloride, the hydrolysis being carried out by a high temperature gas phase reaction; a semisolid substance; a soft solid substance having a melting point not higher than 130° C.; a combination of fine powders of silicon dioxide formed by the hydrolysis of silicon tetrachloride, the hydrolysis being carried out by a high temperature gas phase reaction, and a semisolid substance; or a combination of fine powders of silicon dioxide formed by the hydrolysis of silicon tetrachloride, the hydrolysis being carried out by a high temperature gas phase reaction, and a soft solid substance having a melting point not higher than 130° C.

DETAILED DESCRIPTION OF THE INVENTION

The excellent writing performance described hereinbefore and hereinafter implies that the erasable ballpoint pen ink according to the present invention can provide intense and sharp ink trace, etc., and does not provide any difficulty owing to troubles in the flow of ink or to wearing of ball holders even after using the ball-point pens employing the ink according to the present invention over a long period of time continuously.

In accordance with the present invention, there is also provided an erasable ball-point pen ink comprising a rubber component, a volatile solvent, an organic pigment and a nonvolatile solvent, which additionally comprises fine powders of silicon dioxide formed by the hydrolysis of silicon tetrachloride, the hydrolysis being carried out by a high temperature gas phase reaction, a semisolid substance and a soft solid substance having a melting point not higher than 130° C.

In order to solve the disadvantage (3) mentioned above, there can be used an ink having a reduced viscosity, so as to facilitate the flow of ink. However, the use of such an ink results in very poor erasabilities, that is, not achieving the requirement (1) mentioned above. The flow of ink, therefore, must be improved by other means not involving the reduction in the viscosity of ink. In the present invention, a semisolid substance or a soft solid substance having a melting point not higher than 130° C. can be employed for this purpose. The use of such substance makes it possible to improve the attachment of ink to the surface of a writing ball and to transfer ink onto the surface of paper in a smoother manner, without any reduction in viscosity of ink. As a result, satisfactory ink traces can be formed without impairing the erasability of ink traces.

The disadvantage (4) mentioned above can be effectively eliminated in cases where a pigment component consisting entirely or mostly of organic pigments are employed, instead of conventional inorganic pigments. Organic pigments, however, have only weak coloring capabilities and the use of organic pigments may result in increasing string-forming tendencies, that is, the disadvantage (5) mentioned above, thereby making it difficult to produce satisfactory ink traces. In the present invention, said disadvantage can be solved through the incorporation of fine powders of silicon dioxide formed by the hydrolysis of silicon tetrachloride, the hydrolysis being carried out by a high temperature gas phase reaction, having a particle size not larger than ½ of the clearance between writing ball and ball holder, for example, having a particle size not more than 1.5 microns. By the incorporation of the powders into ink, the elasticity of the rubber component can be reduced and, hence, the flow of ink through the clearance can be made smoother, without any increase in the wearing of ball holder, that is, the disadvantage (4) mentioned above. In addition, the smooth flow could last and the wear of ball holder is prevented over a long period of use of the ball-point pen. Because the stringiness of ink, that is, the disadvantage (5) mentioned hereinabove can also be reduced by the use of the powder, the string-forming phenomenon can also be prevented simultaneously. Namely, the fine powder of silicon dioxide formed by the hydrolysis of silicon tetrachloride, the hydrolysis being carried out by a high temperature gas phase reaction, has a nearly spherical shape. Because the fine powder passes through the clearance (ca. 3 microns) of a writing ball and a ball holder upon rolling, mixed with the other components contained in the ink, due to its spherical shape and as well the fine powder decreases elasticity without rendering the self condensation property of the rubber component undesirably high, the ink can be smoothly fed via the above described clearance. Further, when the fine powder passes through the above described clearance, it hardly corrodes the ball holder. Therefore, the erasability of ink traces can be maintained or improved without impairing the stability of writing performance in the case of continuously using the ball point pen for a long period of time (say more than a writing length of 400 to 1000 m). Further, the reduction in elasticity of the rubber component also contributes to the reduction in the strength of film formed on the surface of a writing ball when a ball-point pen remains unused for some time, so that the film can be easily broken when the ball-point pen is reused. Accordingly, deterioration in initial writing characteristics, that is, the above-described disadvantage (6) can also be dissolved effectively in accordance with the present invention. In addition, when it is particularly necessary to eliminate the weak coloring capabilities resulted from employing organic pigments instead of conventional inorganic pigments, carbon black may be used as auxiliary pigments.

As described hereinabove, the semisolid and soft solid substances used in the present invention are capable of eliminating the disadvantage (3), and the fine powders of silicon dioxide formed by the hydrolysis of silicon tetrachloride, the hydrolysis being carried out by a high temperature gas phase reaction, are capable of eliminating the disadvantages (4) to (6). Thus, there can be obtained a ball-point pen ink providing excellent writing performance, in addition with such excellent erasability that ink traces formed can be readily erased with a rubber eraser within a certain period of time, e.g., a few hours, after writing, in accordance with the present invention.

Components to be used in the ink according to the invention will be explained below.

Examples of useful rubber components include synthetic rubbers of cis-1,4-polyisoprene series, preferably those having a Mooney viscosity of 20 to 26; stryrene-butadiene copolymers, preferably those having a Mooney viscosity of 34 to 37; and the like. The content of the rubber component can be from about 10% to about 28% of the total weight of the ink. If it is less than about 10%, poor erasabilities may result. If the content is more than about 28%, there may be obtained an ink having an undesirably high viscosity and, hence, a poor flowability. In addition, the self-cohesive force of the ink may become so high that the ink could hardly be transferred from the surface of a writing ball onto the surface of paper.

In the present invention, the volative solvent is used to dissolve the rubber component. The solvent may be any low-boiling or medium-boiling solvent having a boiling point of 60° to 170° C. under atmospheric pressure. Examples of useful solvents include aliphatic hydrocarbons, such as n-hexane, isohexane, n-heptane, n-octane, isooctane and n-decane; petroleum solvents, such as solvent naphtha, heavy naphtha, kerosene and ligroin; aromatic hydrocarbons, such as benzene, toluene and xylene; and mixtures of these solvents. The content of the solvent can be from about 20% to about 40% of the total weight of the ink. If the solvent is used in an amount less than about 20%, homogeneous ink would not be obtained because of insufficient dissolving of the rubber component. Ball-point pens using such inks will produce uneven ink traces, or may be clogged at around the writing ball and become totally useless. If the solvent is used in an amount more than about 40%, the resulting inks will have deteriorated erasabilities since they remain fluidable on the surface of paper for undesirably long period of time and penetrate into fibers of the paper.

Examples of organic pigments useful in the present invention azo, anthraquinone, phthalocyanine, triphenylmethane, quinacridone and dioxazine series. It is preferable to use pigments having a particle size of not more than 5 microns and it is particularly preferable to use pigments having a particle size of 0.01 micron to 3 microns. The content of the pigment can be from about 12% to about 35% of the total weight of the ink. If it is less than about 12%, there will be obtained ink which forms ink traces having only insufficient intensities. If it is more than about 35%, ink having an undesirably high viscosity and, hence, a poor flowability will be obtained. In addition to this, such ink will not give good writing stabilities due to an increase in the wearing of the writing tip end.

The nonvolatile solvent used in the ink of the present invention may have a boiling point of about 300° C. or above under atmospheric pressure. Examples of useful solvents include petroleum lubricating oils; plasticizers, such as dioctyl phthalate (DOP), dioctyl adipate (DOA) and dibutyl phthalate (DBP); liquid fatty acids, such as oleic acid; and the like. The content of the nonvolatile solvent can be from about 17% to about 38% of the total weight of the ink. If the content is less than about 17%, there may result an insufficient mixing between a rubber solution (or a solution of a rubber component in a volatile solvent) and a pigment paste (or a milled product of a pigment, a nonvolatile solvent, fine powders of silicon dioxide formed by the hydrolysis of silicon tetrachloride, the hydrolysis being carried out by a high temperature gas phase reaction, a semisolid substance and, optionally, a soft solid substance). In such cases, homogeneous ink could not be obtained. If the content of the nonvolatile solvent is more than about 38%, ink traces having poor erasabilities will be formed.

The fine powder of silicone dioxide formed by the hydrolysis of silicon tetrachloride, the hydrolysis being carried out by a high temperature gas phase reaction, has a primary particle size of not greater than 0.1 micron and mainly has a primary particle size of from 2 to 40 millimicrons. Specific examples of the fine powders include Aerosil 200 (product and trademark of Japan Aerosil Inc.), Aerosil R972 (product and trademark of Japan Aerosil Inc.), Aerosil (380 (product and trademark of Japan Aerosil Inc.), Cab-O-Sil (product of G. L. Cabot Corp.), etc. A process for producing the fine powder is based on the hydrolysis of silicon tetrachloride in high temperature gas phase according to the following equation.

$$SiCl_4 + 2H_2O \rightarrow SiO_2 + 4HCl$$

The content of the powders can be 1% to 10% and preferably 2% to 8% of the total weight of the ink. If the content is more than about 10%, there will be obtained ink having insufficient color densities and ink traces formed therefrom will have undesirably low color intensities. In addition to this, such ink will not flow smoothly out of the writing tip end due to increased viscosity.

Examples of soft solid substances having a melting point not higher than 130° C. which can be suitably used in the ink according to the present invention include petroleum waxes, such as paraffin and ceresine waxes; vegetable waxes, such as carnauba wax, haze tallow and rice wax; animal waxes, such as bees wax and shellac wax; nonionic surface active agents, such as esters of polyoxyethylenes and polyoxyethylene-polyoxypropylene block copolymers. Preferred examples of soft solid substances include petroleum waxes, vegetable waxes, and animal waxes. Examples of semisolid substances to be used in the ink according to the present invention include nonionic surface active agents such as esters of polyoxyethylenes and sorbitan and polyoxyethylene-polyoxypropylene block copolymers; lanolins, such as wool wax; vaselines, such as petrolatum; silicone oils; and the like. The content of such substances may be 1% to 7% and preferably 1% to 5% of the total weight of the ink. If the substances are used in an amount exceeding about 7%, the viscosity of resulting ink would be too high, so that the ink would not flow out of the ball-point pen smoothly. In addition, the ink will have a lowered color intensity.

The present invention will be further illustrated by examples. However, the scope of the invention is not limited to these examples.

EXAMPLE 1

The following components were used in this example.

|  | Parts by Weight |
|---|---|
| Rubber component: IR 2200 (Cis-1.4 Polyisoprene)[1] | 22.2 |
| Volatile solvent: Idemitsu IP Solvent 1016[2] (B.P.: 70-155° C.) | 31.2 |
| Pigments: Chromofine Green 2G-550-D[3] (Phthalocyanine) | 16.0 |
| Fine powders of silicon dioxide Aerosil 200[4] | 2.0 |
| Nonvolatile solvents: |  |
| Dioctyl adipate[5] | 24.6 |

-continued

|  | Parts by Weight |
|---|---|
| Oleic acid | 4.0 |

Notes
[1]Product of Japan Synthetic Rubber Co., Ltd.
[2]Product of Idemitsu Petrochemical Co., Ltd.
[3]Product of Dainichiseika Color & Chemicals Mfg. Co., Ltd.
[4]Product of Japan Aerosil Inc.
[5]Product of Daihachi Kagaku Co., Ltd.

The rubber component was masticated with a mixing roll (a two-roll mill) to a Mooney viscosity of 22. To the resulting rubber component was added the volatile solvent, and the resulting mixture was heated in a sealed vessel for 48 hours at 70° C. to give a rubber solution.

A pigment paste was prepared by kneading the pigments, fine powders of silicon dioxide and the nonvolatile solvents for a period of 3 hours, using a three-roll mill.

The rubber solution and the pigment paste were kneaded with a kneader for 5 hours at 60° to 70° C. to give a green ink.

EXAMPLE 2

In this example were used the following components.

|  | Parts by weight |
|---|---|
| Rubber component: IR 2200 | 18.2 |
| Volatile solvent: Idemitsu IP Solvent 1016 | 27.3 |
| Pigments: Violet RE[1] | 20.7 |
| Soft solid substance: High Grade White Wax A (M.P.: 70° C.)[2] | 5.0 |
| Nonvolatile solvents: |  |
| Dioctyl adipate | 24.8 |
| Oleic acid | 4.0 |

Notes
[1]Produce of Dainichiseika Color & Chemicals Mfg. Co., Ltd.
[2]Product of Ehime Mokuro Co., Ltd.

The soft solid substance was dissolved into the oleic acid at about 80° C. To this solution were added the pigments and the nonvolatile solvents, and the resulting mixture was kneaded with a three-roll mill for 3 hours to give a pigment paste.

From this pigment paste was prepared a violet ink in a similar manner as in Example 1.

EXAMPLE 3

In this example were used the following components.

|  | Parts by weight |
|---|---|
| Rubber component: IR 2200 | 16.0 |
| Volatile solvent: Idemitsu IP Solvent 1016 | 24.0 |
| Pigments: |  |
| Alkali Blue Powder RP-00[1] | 7.2 |
| Brilliant Carmine 1480 | 4.3 |
| Seika Fast Yellow 2720 | 5.5 |
| Carbon Black MA-11[2] | 3.0 |
| Soft solid substance: Paraffin wax 145° F.[3] | 3.0 |
| Fine powders of silicon dioxide: Aerosil R 972[4] (a particle size of 0.1μ) | 4.0 |
| Nonvolatile solvents: |  |
| Dioctyl adipate | 29.0 |

|  | Parts by weight |
| --- | --- |
| Oleic acid | 4.0 |

Notes
[1]Product of Orient Chemical Co., Ltd.
[2]Product of Mitsubishi Chemical Industries Ltd.
[3]Product of Nikko Fine Products Co., Ltd.
[4]Product of Japan Aerosil Inc.

The rubber component was masticated with a mixing roll (a two-roll mill) to a Mooney viscosity of 20. To the resulting rubber component was added the volatile solvent, and the resulting mixture was heated in a sealed vessel for 48 hours at 70° C. to give a rubber solution.

The soft solid substance was dissolved into the oleic acid at about 80° C. To this solution were added the pigments, the fine powders of silicon dioxide and the nonvolatile solvents, and the resulting mixture was kneaded with a three-roll mill for 3 hours to give a pigment paste.

The rubber solution and the pigment paste were kneaded with a kneader for 5 hours at 60° C. to 70° C. to give a black homogeneous ink.

EXAMPLE 4

In this example were used the following components.

|  | Parts by weight |
| --- | --- |
| Rubber component:<br>JSR 1507<br>(styrene-butadiene copolymer)[1] | 15.0 |
| Volatile solvents: | |
| Xylene | 11.0 |
| Ligroin | 9.5 |
| Pigments: | |
| Cyanine Blue 4920 | 9.5 |
| Brilliant Carmine 1480 | 9.5 |
| Seika Fast Yellow 2720 | 9.5 |
| Soft solid substance:<br>Emulgel 306P (polyoxyethylene stearyl ether, M.P.; 90° C.) | 6.5 |
| Fine powders of silicon dioxide:<br>Aerosil 380[3] | 2.5 |
| Nonvolatile solvents: | |
| Dynamo oil | 23.0 |
| Oleic acid | 4.0 |

Notes:
[1]Product of Nihon Synthetic Rubber Co., Ltd.
[2]Product of Kao Soap Co., Ltd.
[3]Product of Japan Aerosil Inc.

The rubber component was masticated to a Mooney viscosity of 35, and then added with the xylol and ligroin. The resulting mixture was heated in a sealed vessel for 60 hours at 80° C. to give a rubber solution.

From this solution was prepared a black ink, in a similar manner as in Example 3.

EXAMPLE 5

A blue ink was prepared from the components shown below, in a similar manner as in Example 1.

|  | Parts by weight |
| --- | --- |
| Rubber component: IR 2200 | 20.5 |
| Volatile solvent:<br>Idemitsu IP Solvent 1016 | 22.5 |
| Pigments: | |
| Alkali Blue Powder RP-00 | 6.7 |
| Cyanine Blue 4920 | 6.6 |
| 718 Fast Blue Conc. SF | 6.7 |
| Fine powders of silicon dioxide:<br>Aerosil 200[1] | 5.0 |
| Nonvolatile solvents: | |
| Dioctyl phthalate | 28.0 |
| Oleic acid | 4.0 |

Note
[1]Product of Japan Aerosil Inc.

EXAMPLE 6

A blue ink was prepared from the components of the following, in a similar manner as in Example 3.

|  | Parts by weight |
| --- | --- |
| Rubber component: IR 2200 | 15.0 |
| Volatile solvent:<br>Idemitsu IP Solvent 1016 | 21.0 |
| Pigments: | |
| Alkali Blue Powder RP-00 | 5.6 |
| Cyanine blue 4920 | 5.6 |
| 718 Fast Blue Conc. SF | 5.6 |
| Soft solid substance:<br>Paraffin wax 145° F. | 3.0 |
| Fine powders of silicon dioxide:<br>Aerosil 200 | 4.0 |
| Nonvolatile solvents: | |
| Dioctyl adipate | 30.2 |
| Oleic acid | 4.0 |

EXAMPLE 7

A red ink was prepared from the components set forth below, in a similar manner as in Example 2, except that the rubber component was adjusted to a Mooney viscosity of 25, and the semisolid substance was used instead of the soft solid substance.

|  | Parts by weight |
| --- | --- |
| Rubber component: IR 2200 | 17.0 |
| Volatile solvent:<br>Idemitsu IP Solvent 1016 | 27.5 |
| Pigments: | |
| Brilliant carmine 1480 | 17.5 |
| Lake Red C[1] | 8.5 |
| Semisolid substance:<br>Lanolin[2] | 5.0 |
| Nonvolatile solvents: | |
| Dioctyl adipate | 20.5 |
| Oleic acid | 4.0 |

Notes
[1]Product of Dainichiseika Color & Chemicals Mfg. Co., Ltd.
[2]Product of Takasago Perfumery Co., Ltd.

EXAMPLE 8

A red ink was prepared from the components of the following, in a similar manner as in Example 1.

|  | Parts by weight |
| --- | --- |
| Rubber component: IR 2200 | 18.0 |
| Volatile solvent:<br>Idemitsu IP Solvent 1016 | 28.7 |
| Pigments: | |
| Brilliant Carmine 1480 | 12.0 |
| Lake Red C | 4.0 |
| Fine powders of silicon dioxide:<br>Aerosil 200 | 9.0 |
| Nonvolatile solvents: | |

-continued

|  | Parts by weight |
|---|---|
| Dioctyl adipate | 24.3 |
| Oleic acid | 4.0 |

WRITING TEST

Each ink prepared in Examples 1 to 8 was filled in ball-point pen refill provided with a stainless steel ball holder and a sintered aventurine writing ball having a diameter of 1 mm or 0.7 mm. Each refill was filled with 0.5 g of ink, charged with nitrogen gas up to 5 atmospheres, and then sealed. Fine ball-point pens (which hereinafter refer to "a ball-point pen set") were prepared for every ink and writing ball diameter.

As control samples, ball-point pens forming an ink trace which remains erasable by a rubber eraser (black, blue and red in color) marketed by two companies were used. Fine ball-point pens (which hereinafter refer to "a control ball-point pen set") were used for each company and ink. These control ball-point pen sets are designated as Control Samples A or B (black), A' or B' (blue) and A" or B" (red).

Comparison tests were carried out by operating a test machine at a writing speed of 4 m/min. In horizontal circular movements, at a writing angle of 70° with a writing load of 200 g, at ambient temperature of 20° C. and at a relative humidity of 60%.

In writing property tests, circles corresponding to a line length of 1000 m were written with each ball-point pen set and control ball-point pen set. Thins, discontinuations and globs formed during the writings were observed. Strings formed during early stages of the writings, as well as unevenness in the intensity of ink traces appeared at the point of 100 m and afterwards due to the wearing of ball holders were also observed. Results obtained in each ball-point pen set and control ball-point pen set were rated with o, Δ and X, wherein o indicates excellent, Δ indicates good and X indicates bad. Erasabilities were evaluated by rubbing the ink traces written with each ball-point pen set and control ball-point pen set 5 times to and fro by hand with an ordinary force soon after the writings, using a rubber eraser of an ordinary type available in the market which does not contain any abrasives. Results obtained in each ball-point pen set and control ball-point pen set were rated from 5 to 1, wherein 5 indicates good and 1 indicates poor.

In initial writing tests, ball point-pen sets and control ball-point pen sets capable of giving normal ink traces were permitted to stand without caps for 24 hours at a temperature of 40° C. and a relative humidity of 60%, and then subjected to writing tests. Distances between the starting points and the points at which ink traces started to appear (i.e., points at which the ball-point pens became writable again) were measured. The longest distances and shortest distances in each ball-point pen set and control ball-point pen set were rated.

In clogging tests, after circles corresponding to a line length of 1000 m were written with each ball-point pen set and control ball-point pen set, the number of ball-point pens which were clogged at around the writing ball and become totally useless among each ball-point pen set and control ball-point pen set was also rated. Results obtained are shown in Table 1.

TABLE 1

| | | Ink Used or Control Sample Used | | | | Writing Properties During Early stage of Writing | | | |
|---|---|---|---|---|---|---|---|---|---|
| Test No. | Examples | Content of Fine Powder of Silicon Dioxide | Content of Soft Solid or Semisolid Substance | Color | Diameter Writing Ball (mm) | Thin | Discontinuation | Glob | String |
| 1 | Example 1 | 2.0 | — | Green | 1.0 | o | o | o | Δ |
| 2 | " | 2.0 | — | " | 0.7 | o | o | o | o |
| 3 | Example 2 | — | 5.0 | Violet | 1.0 | o | o | o | Δ |
| 4 | " | — | 5.0 | " | 0.7 | o | o | o | o |
| 5 | Example 3 | 4.0 | 3.0 | Black | 1.0 | o | o | o | o |
| 6 | " | 4.0 | 3.0 | " | 0.7 | o | o | o | o |
| 7 | Example 4 | 2.5 | 6.5 | " | 1.0 | o | o | o | o |
| 8 | " | 2.5 | 6.5 | " | 0.7 | Δ | o | o | o |
| 9 | Example 5 | 5.0 | — | Blue | 1.0 | o | o | o | o |
| 10 | " | 5.0 | — | " | 0.7 | Δ | o | o | o |
| 11 | Example 6 | 4.0 | 3.0 | " | 1.0 | o | o | o | o |
| 12 | " | 4.0 | 3.0 | " | 0.7 | o | o | o | o |
| 13 | Example 7 | — | 5.0 | Red | 1.0 | o | o | o | Δ |
| 14 | " | — | 5.0 | " | 0.7 | o | o | o | o |
| 15 | Example 8 | 9.0 | — | " | 1.0 | o | o | o | o |
| 16 | " | 9.0 | — | " | 0.7 | o | o | o | o |
| 17 | | Control Sample A | | Black | 1.0 | Δ | Δ | o | o |
| 18 | | Control Sample A' | | Blue | 1.0 | X | Δ | o | o |
| 19 | | Control Sample A" | | Red | 1.0 | o | o | Δ | Δ |
| 20 | | Control Sample B | | Black | 1.0 | Δ | Δ | o | o |
| 21 | | Control Sample B' | | Blue | 1.0 | o | o | Δ | Δ |
| 22 | | Control Sample B" | | Red | 1.0 | o | o | Δ | X |

| | Writing Properties | | | | | | | | | |
|---|---|---|---|---|---|---|---|---|---|---|
| | During 100 to 500 m of Writing | | | | During 500 to 1000 m of Writing | | | | | |
| Test No. | Thin | Discontinuation | Glob | Unevenness in Intensity | Thin | Discontinuation | Glob | Unevenness in Intensity | Clogging | Initial Writing (mm) | Erasability |
| 1 | o | o | o | o | o | o | o | o | None | 0–4 | 4 |
| 2 | o | o | o | o | o | o | o | o | " | 0–5 | 5 |
| 3 | o | o | o | o | o | o | o | o | " | 0–3 | 3 |
| 4 | o | o | o | o | Δ | o | o | o | " | 0–5 | 5 |
| 5 | o | o | o | o | o | o | o | o | " | 0 | 4 |
| 6 | o | o | o | o | o | o | o | o | " | 0–2 | 5 |

TABLE 1-continued

| | | | | | | | | | | | |
|---|---|---|---|---|---|---|---|---|---|---|---|
| 7 | o | o | o | o | o | o | o | Δ | " | 1–6 | 3 |
| 8 | o | o | o | Δ | o | o | o | Δ | " | 2–10 | 3 |
| 9 | o | o | o | o | o | o | o | o | " | 0–4 | 3 |
| 10 | o | o | o | o | o | o | o | o | " | 2–10 | 4 |
| 11 | o | o | o | o | o | o | o | o | " | 0–3 | 3 |
| 12 | o | o | o | o | o | o | o | o | " | 2–7 | 4 |
| 13 | o | o | o | o | o | o | o | o | " | 1–9 | 2 |
| 14 | o | o | o | o | o | o | o | o | " | 3–11 | 4 |
| 15 | o | o | o | o | o | o | o | o | " | 0–5 | 4 |
| 16 | o | o | o | o | o | o | o | Δ | " | 2–7 | 4 |
| 17 | Δ | o | o | o | X | Δ | o | o | " | 0–29 | 4 |
| 18 | X | Δ | o | o | X | X | o | o | " | 0–18 | 4 |
| 19 | o | o | X | o | X | Δ | o | o | " | 0–20 | 2 |
| 20 | X | Δ | Δ | X | X | X | o | X | 4 | 13–339 | 2 |
| 21 | Δ | Δ | o | Δ | X | X | o | X | 2 | 4–428 | 2 |
| 22 | Δ | Δ | Δ | Δ | X | X | o | Δ | 2 | 17–309 | 1 |

As seen from the table, the ball-point pens employing inks according to Examples 1 to 8 are capable of maintaining highly stable ink traces over long distances, compared with the marketed ball-point pens. In particular, remarkably improved results are obtained in unevenness in the intensity of ink traces which may be caused by the wearing of ball holders, as well as in thins, discontinuations and cloggings which may be caused by ground pieces generated due to wear. In the initial writing tests, too, the samples according to the invention are by far superior to the marketed products.

In addition, the erasabilties of the samples according to the invention are comparable or even better than those of the marketed ball-point pens.

While the invention has been described in detail and with reference to specific embodiments thereof, it will be apparent to one skilled in the art that various changes and modifications can be made therein without departing from the spirit and scope thereof.

What is claimed is:

1. An erasable ball-point pen ink, comprising, based on the total weight of the ink:
   10% to 28% of a rubber component selected from the group consisting of a synthetic rubber of cis 1,4-polyisoprene and a styrene-butadiene copolymer;
   20% to 40% of a volatile solvent having a boiling point in the range of from 60° C. to 70° C. under atmospheric pressure selected from the group consisting of an aliphatic hydrocarbon, an aromatic hydrocarbon and mixtures thereof;
   12% to 35% of a coloring organic pigment selected from the group consisting of the azo, anthraquinone, phthalocyanine, triphenylmethane, quinacridone and dioxazine series; and
   17% to 38% of a nonvolatile solvent having a boiling point of 300° C. or above under atmosphere pressure selected from the group consisting of petroleum lubricating oils, aliphatic or aromatic esters and oleic acid;
   which additionally comprises:
   2% to 8% of the fine powder of silicon dioxide formed by the hydrolysis of silicon tetrachloride, the hydrolysis being carried out by a high temperature gas phase reaction;
   1% to 7% of the components selected from the group consisting of petroleum waxes, vegetable waxes, animal waxes, nonionic surface active agents, lanolins, vaselines and silicon oils; or
   mixtures of the 2% to 8% of the fine powder of silicon dioxide formed by the hydrolysis of silicon tetrachloride, the hydrolysis being carried out by high temperature gas phase reaction with the 1% to 7% of the components selected from the group consisting of petroleum waxes, vegetable waxes, animal waxes, nonionic surface active agents, lanolin, petrolatum and silicon oil.

2. An erasable ball-point pen ink as claimed in claim 1, wherein the additional component is 1% to 7% of the components selected from the group consisting of petroleum waxes, vegetable waxes, animal waxes, nonionic surface active agents, lanolin, petrolatum and silicon oil.

3. An erasable ball-point ink as claimed in claim 1, wherein the additional component is the mixtures of the 2% to 8% of the fine powder of silicon dioxide formed by the hydrolysis of silicon tetrachloride, the hydrolysis being carried out in a high temperature gas phase reaction, with the 1% to 7% of the components selected from the group consisting of petroleum waxes, vegetable waxes, animal waxes, nonionic surface active agents, lanolin, petrolatum and silicon oil.

4. An erasable ball-point pen ink as claimed in claim 1, wherein the organic pigment has a particle size of not more than 5 microns.

5. An erasable ball-point pen ink as claimed in claim 1, wherein the fine powders have a diameter or particle size of not greater than 0.1 micron.

6. An erasable ball-point pen ink as claimed in claim 1, wherein the additional component is only the fine powders of silicon dioxide formed by the hydrolysis of silicon tetrachloride, the hydrolysis being carried out by a high temperature gas phase reaction.

7. An erasable ball-point pen ink as claimed in claim 1, wherein the additional component is selected from the nonionic surface active agents, lanolin, petrolatum and silicon oil.

8. An erasable ball-point pen ink as claimed in claim 1, wherein the additional component is selected from the group consisting of petroleum waxes, vegetable waxes, animal waxes and non-ionic surface active agents.

9. An erasable ball-point pen as claimed in claim 1, wherein the additional component is selected from the petroleum waxes, vegetable waxes, animal waxes and nonionic surface active agents.

10. An erasable ball-point pen ink as claimed in claim 1, wherein the synthetic rubber of cis-1,4-polyisoprene has a Mooney viscosity of 20 to 26 and the styrene-butadiene copolymer has a Mooney viscosity of 34 to 37.

11. An erasable ball-point pen ink as claimed in claim 1, wherein the volatile solvent is selected from the group consisting of n-hexane, iso-hexane, n-heptane, n-octane, iso-octane, n-decane, benzene, toluene, xylene, and mixtures thereof.

* * * * *